United States Patent [19]

Ruckel et al.

[11] 4,380,513

[45] Apr. 19, 1983

[54] INERT ROSIN ESTERS AND PROCESS FOR PREPARING THE SAME

[75] Inventors: Erwin R. Ruckel, Wilton; Martin Epstein, Norwalk, both of Conn.

[73] Assignee: Arizona Chemical Company, Fairlawn, N.J.

[21] Appl. No.: 325,700

[22] Filed: Nov. 30, 1981

[51] Int. Cl.$^3$ ............................. C09F 7/00; C09F 1/00
[52] U.S. Cl. ...................................... 260/104; 260/101
[58] Field of Search ................................ 260/101, 104

[56] References Cited

U.S. PATENT DOCUMENTS

| | | | |
|---|---|---|---|
| 2,251,070 | 7/1941 | Schantz | 260/104 |
| 2,322,197 | 6/1943 | Oswald | 260/101 |
| 2,404,033 | 7/1946 | Burrell | 260/104 |
| 4,172,070 | 10/1979 | Scharrer et al. | 260/103 |

*Primary Examiner*—H. S. Cockeram
*Attorney, Agent, or Firm*—Gordon L. Hart

[57] ABSTRACT

Inert esters of rosin and a primary polyhydric alcohol, such as rosin-pentaerythritol esters, are modified by reacting commercially available rosin esters which contain residual hydroxyl groups with a lower aliphatic carboxylic acid or anhydride, for example, acetic anhydride or propionic anhydride, to substantially completely esterify the residual hydroxyl groups. The resulting inert, completely esterified rosin esters, when formulated with non-polar natural rubber or SBR in adhesive systems, results in a time-stable tack value not available with conventional rosin esters.

10 Claims, No Drawings

INERT ROSIN ESTERS AND PROCESS FOR PREPARING THE SAME

The invention relates to improvements in esters of rosin and primary polyhydric alcohols, such as rosin-pentaerythritol esters. The invention also relates to a process for making inert rosin esters by reacting a rosin ester of a primary polyhydric alcohol, which contains residual hydroxyl groups, with a lower carboxylic acid or acid chloride or anhydride. In a less preferred alternative process to obtain inert rosin esters of the invention rosin acid may be transesterified by reaction with a low molecular weight fully esterified polyol, such as pentaerythritol tetraacetate, to obtain a completely esterified rosin ester.

The modified rosin esters contain negligible unesterified hydroxyl groups, hence they have superior properties as tackifiers, for example, when formulated with non-polar elastomers such as natural rubber or styrene butadiene rubber (SBR) systems. Such formulations have time-stable tack values superior to those obtained using the conventional rosin esters which contain residual hydroxyl groups.

Preparation of rosin esters, such as esters of rosin and pentaerythritol, is well known. One method of preparing these esters is described in U.S. Pat. No. 4,172,070 to Scharrer et al. Other methods are also known and some were described in references cited by the Scharrer et al patent. In those esterification reactions, not all of the hydroxyl groups in the alcohol will be reacted with rosin. Rosin-penaerythritol esters prepared by the known methods will contain typically from 0.2 to 1.0 residual, unesterified hydroxyl group per pentaerythritol moiety. Rosin dipentaerythritol esters will typically contain from 0.5 to 3.0 unesterified hydroxyl groups per dipentaerythritol moiety. The presence of residual hydroxyl groups in the rosin esters makes them less desirable for use as tackifiers in adhesive systems. The residual hydroxyl groups can cause a number of adverse effects, such as an unstable tack value which deteriorates with time.

Rosin esters of polyhydric alcohols, such as rosin-pentaerythritol esters, can be modified to improve their usefulness as tackifiers in adhesive formulations.

Improved esters can be prepared from a rosin ester of a polyhydric alcohol. In the rosin ester, about 50 to about 95 percent of the available hydroxyl groups of the polyhydric alcohol will be esterified with rosin. The remainder of the hydroxyl groups are unesterified in the unmodified rosin ester. In accordance with the invention, the rosin ester is reacted with a lower molecular weight carboxylic acid, acid chloride or acid anhydride, such as acetic anhydride or propionic anhydride, to completely esterify the residual unesterified hydroxyl groups in the rosin ester, leaving no more than negligible unreacted hydroxyl content in the modified rosin esters.

The reaction of the rosin ester with an aliphatic acid or acid chloride or acid anhydride may be carried out, preferably using an excess of the aliphatic acid reactant. The excess acid remaining after the reaction can conveniently be separated from the modified rosin ester by distillation after the esterification is complete. Reaction temperatures typically will be in the range from about 40° C. to about 200° C. It is preferred to carry out the esterification in liquid phase under an inert gas atmosphere to minimize oxidation and other side reactions. Solvents for the reactants may be used but will not always be necessary.

The reaction mixture is held at the reaction temperature for time sufficient to complete the esterification. Usually about two hours reaction time will be sufficient.

The inert rosin esters of the present invention may be employed as tackifiers for synthetic rubber in the following manner: The inert rosin ester is dissolved in a toluene solution of SYNPOL® 1011A elastomer in such amount that the final ratio is 75 parts of the ester as tackifier per 100 parts of the elastomer. This solution, made up to 15% solids is coated on a suitable substrate such as MYLAR® polyester film to make an adhesive coating which will retain the stable tack property over a longer period of time than one made with rosin esters containing free hydroxyl groups.

By the term "negligible hydroxyl content" we mean no more than 0.5 percent of the original hydroxyl groups in the polyhydric alcohol on which the ester is based remain unesterified, for example, less than 0.02 hydroxyl groups per rosin-pentaerythritol ester molecule.

A specific embodiment of the invention is described in more detail in the following example.

EXAMPLE I

To a 3-necked, 1-liter flask was charged 500 g of a commercially available rosin pentaerythritol ester (ZONESTER® 100) which had the following physical properties: Color=WG; AN (acid number)=8.6; SP (softening point)=96° C.; MW (molecular weight)=965; degree of esterification by nuclear magnetic resonance (NMR)=3.15/4.0. The flask was equipped with a nitrogen inlet, thermometer, stirrer and addition funnel and the ester was heated to a temperature of 140° C. under an atmosphere of nitrogen gas. Acetic anhydride, 66.5 g, 0.65 mole, was added dropwise to the reaction mixture. The mixture was stirred at a temperature of 140° C. for a period of 2 hours. The addition funnel was replaced with a distilling head and a water cooled condenser and the reaction temperature was slowly raised to 200° C. Forty three ml of unreacted acetic anhydride and acetic acid (b.p. 118° C.) was distilled from the reaction mixture.

A sample taken from the flask was found to have a softening point (SP) of 85.5° C. In order to increase the softening point to 95° C., the system was heated to a temperature of 250° C. and purged with a strong stream of nitrogen. Samples were removed periodically for SP determinations. After 5½ hours, the desired SP of 95°–100° C. was obtained, the reaction mixture was cooled to 200° C. and discharged. The physical properties of the product were as follows: Color=N; AN=2.5; SP=95° C.; MW=1120; degree of esterification (by NMR)=4.0/4.0.

In this example, excess acetic anhydride was reacted with the rosin-pentaerythritol resin. The theoretical amount of anhydride needed to yield a completely esterified product is 0.442 mole, based on the degree of esterification as obtained by NMR.

EXAMPLE II

The procedure of Example I was followed in every specific detail except 100 g of a rosin-pentaerythritol ester (Zonester 100) having specific properties listed in Example I was reacted with 25.0 g (0.13 moles) of pivalic anhydride (MW 186.4, density 0.905, b.p. 164° C.) instead of acetic anhydride. Upon raising the temperature to 200° C., 17 ml of pivalic acid and unreacted anhydride was distilled from the reaction mixture. The product had a color of WW, SP 95°, AN 1.4, MW 1075 and degree of esterification 4.0/4.0.

The rosin ester produced in accordance with this example was evaluated as a tackifier in an adhesive composition based on SYNPOL 1011A styrene-butadiene synthetic rubber. The data shown in Table 1 demonstrates superiority of the completely esterified rosin ester over the conventional rosin ester (Zonester 100) in use as a tackifier in synthetic and natural rubber compositions.

TABLE 1

| Rosin Ester[1] | Tack (Inches)[2] | | |
|---|---|---|---|
| | 0 | 2 | 6 |
| | (weeks stored at 60° C.) | | |
| Standard ZONESTER 100 Totally Esterified | 3 | 5 | >15(T) |
| ZONESTER 100 | 2 | 3 | 3 |

[1]Used at 75 parts by wt Rosin Ester per 100 parts rubber
[2]ASTM Test method PSTC-18
(T)Tacky to touch The rosin color standards described in the examples are U.S.D.A. standards, ranging from X, the lightest, to D, the darkest color. The order of the U.S.D.A. scale of colors is as follows: X, WW, WG, N, M, K, I, H, G, F, E and D.

In the above examples, the degree of esterification (ratio of ester groups in the sample to available hydroxyl groups in the starting polyol) was determined by both NMR and active hydrogen. The NMR was based on the integration of a proton NMR spectrum where the ratio of $CH_2O/CH_2OCO$ is obtained and from which the degree of esterification is calculated. The active hydrogen was determined by an analysis where the sample, dissolved in toluene, is reacted with a measured excess of phenyl isocyanate in the presence of stannous octoate for 2-2.5 hours. Subsequent addition of a precise excess of dibutylamine and titration with perchloric acid results in an active hydrogen value which, which when divided by 100 and subtracted from 4 (for pentaerythritol) is converted into a degree of esterification.

In general, the ester of any rosin may be employed in accordance with the present invention. For example, gum, wood and tall oil rosins may be converted into a rosin ester which may be modified in accordance with the invention.

Furthermore, although pentaerythritol was the polyhydric alcohol for the rosin esters prepared in the examples for illustrative purposes, and is the preferred polyhydroxy alcohol component of rosin esters to be modified by the present invention, the invention may comprise modified rosin esters made with other primary polyhydric alcohols, for example, di- or tripentaerythritol, trimethylolethane, trimethylolpropane, glycerol, diethylene glycol and other equivalent primary polyhydric alcohols.

To prepare the rosin ester, rosin is generally reacted with a primary polyhydric alcohol at temperatures from about 150° C. to about 300° C. and usually an excess of the alcohol is employed, although an excess of the rosin may be employed.

For the subsequent complete esterification to yield inert rosin esters according to this invention, the suitable low molecular weight acids or anhydrides or acid halides that may be used include aliphatic $C_2-C_{10}$ monocarboxylic acids and/or their anhydrides or acid halides. The most preferred are the lower molecular weight acids within the defined class, such as acetic acid or propionic acid or their respective anhydrides or acid halides.

The inert rosin esters have been improved by the present invention for use as tackifiers in adhesive systems. Particularly they are found to impart improved tack stability on aging when employed as tackifiers with non-polar elastomers such as natural rubber, styrene-butadiene rubber (SBR), NATSYN ®, and the like.

The following additional examples illustrate the particular improvement of rosin esters modified according to the present invention by comparison with unmodified rosin esters which have not been so completely esterified. Data on the use of the modified rosin esters described in Example I evaluated in adhesive compositions made with 90 parts by wt of the modified ester and 100 parts by wt of natural rubber, are presented in Table 2.

TABLE 2

| Rosin Ester[1] | Tack (Inches)[2] | | |
|---|---|---|---|
| | 0 | 2 | 6 |
| | (weeks stored at 60°) | | |
| Standard ZONESTER 100 Totally Esterified | 5 | 10 | T[3] |
| ZONESTER 100 | 3 | 4 | 7 |

[1]Used at 90 parts per 100 parts of natural rubber
[2]ASTM Test method PSTC-18
[3]Tacky to touch (>15 inches)

We claim:

1. A modified rosin ester of a primary polyhydric alcohol, said ester having 50 to 95 percent of the hydroxyl groups of the polyhydric alcohol esterified with rosin and the remaining hydroxyl groups esterified with lower aliphatic monocarboxylic acid or acid chloride or acid anhydride and no more than negligible residual hydroxyl content.

2. A modified rosin ester of claim 1, wherein the primary polyhydric alcohol is pentaerythritol.

3. The rosin ester according to claim 2, wherein the low molecular weight carboxylic acid or anhydride is acetic acid or acetic anhydride.

4. The rosin ester according to claim 2, wherein the low molecular weight carboxylic acid or anhydride is propionic acid or propionic anhydride.

5. The rosin ester according to claim 2 wherein the low molecular weight carboxylic acid or anhydride is pivalic acid or pivalic anhydride.

6. A process for the preparation of the modified ester of claim 1, which comprises: reacting a lower aliphatic monocarboxylic acid or acid chloride or anhydride with the unesterified hydroxyl groups of an ester of rosin and a primary polyhydric alcohol, said ester having between about 50% and about 95% of the hydroxyl groups of the alcohol esterified with rosin, at a temperature from about 40° C. to about 200° C.

7. The process of claim 6, wherein the primary polyhydric alcohol component of the modified rosin ester is pentaerythritol.

8. The process according to claim 7, wherein the low molecular weight carboxylic acid component of the modified rosin ester is acetic acid or anhydride.

9. The process according to claim 7, wherein the low molecular weight acid or anhydride component of the modified rosin ester is propionic acid or anhydride.

10. The process according to claim 7, wherein the low molecular weight acid or anhydride component of the modified rosin ester is pivalic acid or anhydride.

* * * * *